(12) United States Patent
Danehy et al.

(10) Patent No.: US 10,417,779 B2
(45) Date of Patent: Sep. 17, 2019

(54) METHODS AND SYSTEMS FOR PROCESSING PLENOPTIC IMAGES

(71) Applicants: THE UNITED STATES OF AMERICA, AS REPRESENTED BY THE ADMINISTRATOR OF THE NASA, Washington, DC (US); Auburn University, Office of Innovation Advancement and Commercialization, Auburn, AL (US)

(72) Inventors: Paul M. Danehy, Newport News, VA (US); Brian S. Thurow, Auburn, AL (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 252 days.

(21) Appl. No.: 15/634,533

(22) Filed: Jun. 27, 2017

(65) Prior Publication Data
US 2018/0005402 A1    Jan. 4, 2018

Related U.S. Application Data

(60) Provisional application No. 62/356,129, filed on Jun. 29, 2016.

(51) Int. Cl.
*G06T 7/00* (2017.01)
*G06T 7/60* (2017.01)
(Continued)

(52) U.S. Cl.
CPC .............. *G06T 7/60* (2013.01); *G06K 9/2027* (2013.01); *H04N 5/2254* (2013.01); *H04N 9/045* (2013.01)

(58) Field of Classification Search
None
See application file for complete search history.

(56) References Cited

U.S. PATENT DOCUMENTS

2014/0340570 A1* 11/2014 Meyers .................. H04N 5/211
                                                              348/370
2016/0005154 A1*  1/2016 Meyers .................. G06T 5/007
                                                              382/274

(Continued)

OTHER PUBLICATIONS

Fahringer et el., "Design of a Multi-Color Plenoptic Camera for Snapshot Hyperspectral Imaging", American Institute of Aeronautics and Astronautics, pp. 1-9.

(Continued)

*Primary Examiner* — Delomia L Gilliard
(74) *Attorney, Agent, or Firm* — Jonathan B. Soike; Robin W. Edwards; Helen M. Galus

(57) ABSTRACT

Methods and systems are disclosed for deriving quantitative measurements of an imaged material using plenoptic imaging. In one or more embodiments, image data is generated by a plenoptic camera having a filter configured to transmit a plurality of different spectra in different regions of the filter. A set of plenoptic image data is produced by determining respective sets of pixels in the image data corresponding to the different regions of the filter and determining light intensities of the plurality of different spectra for respective super-pixel groups of the pixels in the image data. One or more additional quantitative measurements of an imaged material are then derived from a comparison of the determined light intensities of two or more of the plurality of different spectra.

20 Claims, 7 Drawing Sheets

(51) Int. Cl.
  *G06K 9/20*   (2006.01)
  *H04N 5/225*  (2006.01)
  *H04N 9/04*   (2006.01)

(56) References Cited

U.S. PATENT DOCUMENTS

2016/0139243 A1* 5/2016 Send .................... G01S 7/4816
                                                  250/221
2017/0332000 A1* 11/2017 Wang ................... H04N 5/2355
2017/0337413 A1* 11/2017 Bhat .................... G06K 9/0002

OTHER PUBLICATIONS

Hagen et al., "Review of Snapshot Spectral Imaging Technologies," Optical Engineering, vol. 52, 2013, p. 90901.
Gang et al., "Temperature Profiling of Pulverised Coal Flames Using Multi-Colour Pyrometric and Digital Imaging Techniques," 2005 IEEE Instrumentationand Measurement Technology Conference Proceedings, 2005, pp. 1658-1662, vol. 3.
Adelson et al., "The Plenoptic Function and the Elements of Early Vision," Computational Models of Visual Processing, 1991, pp. 3-20.
Adelson et al., "Single Lens Stereo with a Plenoptic Camera," IEEE Transactions on Pattern Analysis and Machine Intelligence, 1992, pp. 99-106, vol. 14.
Levoy et al., "Light Field Rendering," Proceedings of the 23rd Annual Conference on Computer Graphics and Interactive Techniques—SIGGRAPH '96, 1996, pp. 31-42.
Ng et al., "Light Field Photography with a Hand-held Plenoptic Camera," Informational, 2005, pp. 1-11.
Danehy et al., "A Plenoptic Multi-Color Imaging Pyrometer," 55th AIAA Aerospace Sciences Meeting, 2017 pp. 1-7.

* cited by examiner

METHODS AND SYSTEMS FOR PROCESSING PLENOPTIC IMAGES

CROSS-REFERENCE TO RELATED PATENT APPLICATION(S)

This patent application claims the benefit of and priority to U.S. Application No. 62/356,129, entitled "Plenoptic Spectral Imaging (PSI) Multi-Spectral Imaging For Metrology Using Plenoptic Camera Technology," and filed on Jun. 29, 2016, the contents of which are hereby incorporated by reference in their entirety.

STATEMENT REGARDING FEDERALLY SPONSORED RESEARCH OR DEVELOPMENT

The invention described herein was made, in part, in the performance of work under a NASA contract and by an employee/employees of the United States Government and is subject to the provisions of Public Law 96-517 (35 U.S.C. §202) and may be manufactured and used by or for the Government for governmental purposes without the payment of any royalties thereon or therefore.

OVERVIEW

The present invention generally relates to imaging devices and more particularly to multi-spectral imaging devices. Consumer off-the-shelf cameras typically include an array of red, green, and blue filters (e.g., Bayer filters) permanently affixed in front of a camera sensor. However these filter arrays may not be suitable for many scientific applications that require imaging of specific wavelengths of light. For example, a Bayer filter array may not transmit the entire spectrum of interest for a given application. As another example, a particular filter segment (e.g. green) in a Bayer filter array may transmit multiple nearby wavelengths, which are required to be imaged separately.

Multi-spectral imaging systems (also referred to as hyper-spectral imaging systems) may be used in various applications to simultaneously or sequentially capture images at the specific wavelengths of interest. Some multi-spectral system use beam splitters or other optical elements to direct light of different wavelength to respective greyscale sensors for imaging. These systems are cumbersome and quickly grow in size as more wavelengths are added. Accordingly, such systems are typically limited to measurements in a single line of sight. Some other multi-spectral imaging systems include filters for different wavelengths on a mechanical disk (called a filter wheel). The filter wheel is rotated in front in a greyscale sensor to sequentially acquire images at different wavelengths. However, use filter-wheel systems present several drawbacks. For instance, filter-wheel apparatus are typically bulky and include moving parts, which are subject to failure. Moreover, since the images are taken at different times, data acquisition rate is slowed and imaging of transient events is inhibited.

The disclosed embodiments may address one or more of the above issues.

SUMMARY

The present disclosure describes methods and systems for deriving quantitative measurements of an imaged material using plenoptic imaging. Imaged material(s) may include solid matter as well as fluidic transparent or semitransparent or other absorptive or emitting matter including, for example, a plume of gas, a flame, or a plasma.

In one or more embodiments, image data is generated by a plenoptic camera having a filter configured to transmit light with a plurality of different characteristics (e.g., different wavelengths, polarity, and/or angular perspective) in respective regions of the filter. A set of plenoptic image data is produced by determining respective sets of pixels in the image data corresponding to the different regions of the filter and determining intensities of light with the plurality of different characteristics for respective super-pixel groups of the pixels in the image data. One or more additional quantitative measurements of an imaged material are then derived from a comparison of the determined intensities of light of two or more of the plurality of different characteristics.

In another embodiment, an apparatus is configured to derive quantitative measurements of an imaged material using plenoptic imaging. The apparatus includes a first processing circuit configured to receive image data from a plenoptic camera having a filter configured to transmit light with a plurality of different characteristics in respective a plurality of different spectra in different regions of the filter. The first processing circuit is further configured to, in response to receiving the image data, produce a set of plenoptic image data by determining respective sets of pixels in the image data corresponding to the different regions of the filter and determining light intensities of the plurality of different spectra for respective super-pixel groups in the image data. The apparatus also includes a second processing circuit coupled to the first processing circuit. The second processing circuit is configured to derive one or more additional quantitative measurements of an imaged material from a comparison of the determined intensities of light of two or more of the plurality of different characteristics.

These and other features, advantages, and materials of the present disclosure will be further understood and appreciated by those skilled in the art by reference to the following specification, claims, and appended drawings.

DETAILED DESCRIPTION

Figure 1:
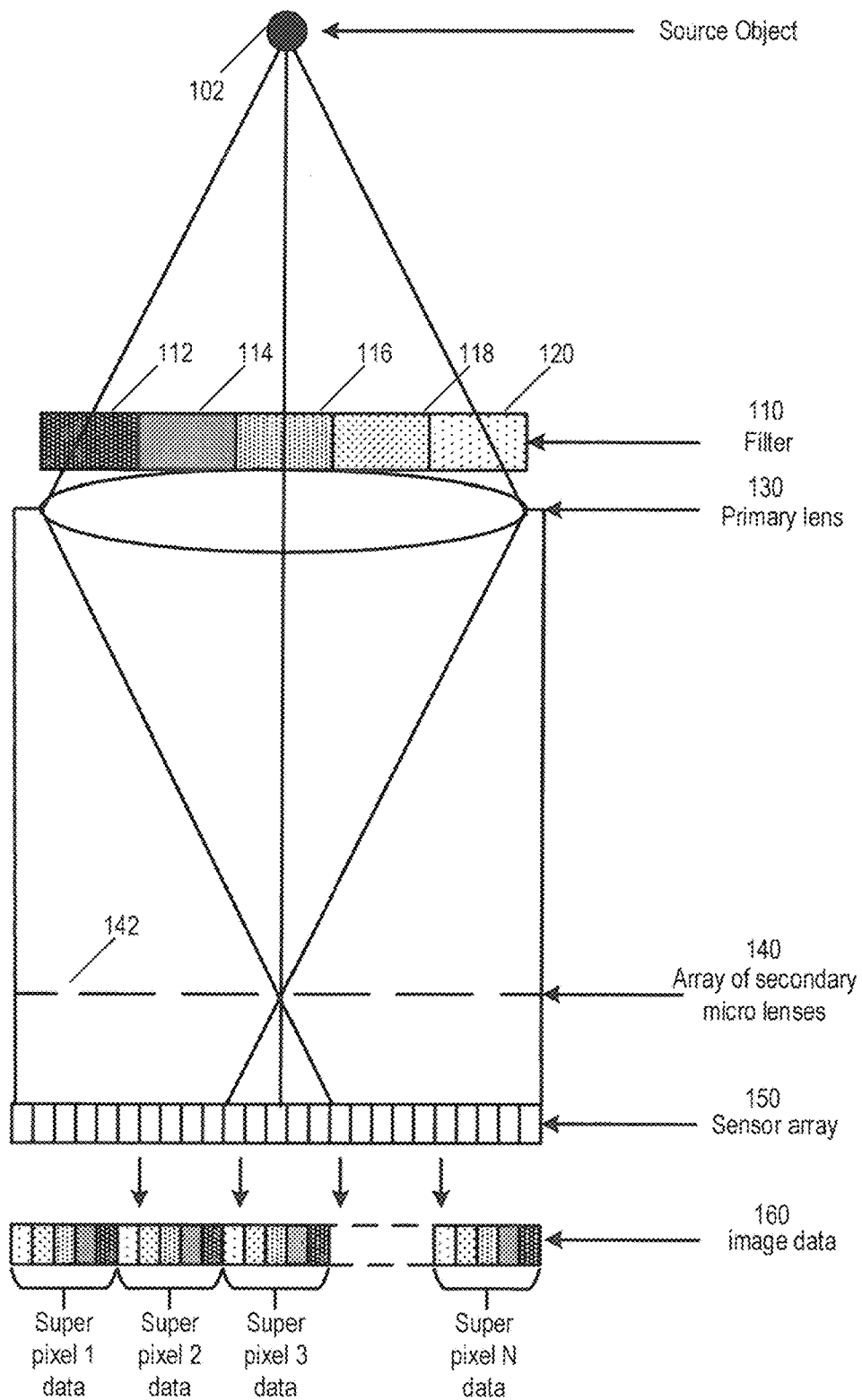
FIG. 1 shows a plenoptic camera configured in accordance with one or more embodiments of the present disclosure.

Aspects of the present disclosure are directed to imaging applications that address challenges including those discussed above, and are applicable to a variety of applications, devices, systems, and methods for deriving various quantitative measurements using plenoptic imaging techniques. A plenoptic camera is similar to a conventional greyscale camera except that an array of secondary lenses (e.g., micro lenses) is placed in front of the sensor. The use of the lens array allows measurement of additional information about the light that collected by the primary lens. Additional information may include, for example, the angle of the incident rays and/or the intensity of multiple individual wavelengths of interest. In one or more embodiments, this additional information is utilized to derive various quantitative measurements about imaged materials for multiple lines of sight across the image field. These and other aspects of the present disclosure are exemplified in a number of implementations and applications, some of which are shown in the figures and characterized in the claims section that follows. It should be noted that the figures may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated.

For ease of explanation, the disclosed embodiments are primarily discussed with reference to performing spectral and/or geometric based analysis of plenoptic image data captured by a single plenoptic camera. However, the embodiments are not so limited. Rather, some embodiments may perform spectral and/or geometric based analysis on plenoptic image data captured from multiple plenoptic cameras configured as described herein.

Turning now to the figures, FIG. 1 shows a plenoptic camera configured in accordance with one or more embodiments of the present disclosure. The plenoptic camera includes a front filter array 110 having a plurality of different segments 112, 114, 116, 118, and, 120. Each segment is configured to pass a respective wavelength of light, (also known as a band-pass filter). The segments can be discrete or continuous. For instance, each segment can have a uniform transmission bandwidth across the segment with different segments having different, or the same, transmission wavelength. Alternatively, the filter may include an infinite number of segments wherein the transmission, wavelength continuously varies across a single large filter. Furthermore several such continuously variable filters can be placed in this plane. The filters themselves could be interference filters, absorptive filters, could be made of a transparent solid material (e.g. glass or quartz) or gaseous (e.g. iodine or mercury vapor) or polarization selective elements or Fabry Perot etalons or Fizeau etalons Also neutral density filters can be used to extend the dynamic range of the measurements. Combinations of any of these filters can be used.

Incident light reflected from a source material 102 is filtered by the filter array 110 and then passes through a primary lens 130 of the camera. Light from the primary lens 130 is focused by an array 140 of secondary lenses 142. The secondary lenses may be implemented with various types of lenses including, for example, pinholes or physical microlenses. Each secondary lens in the array focuses a projection of the filtered image (i.e., as filtered by filter array 110) onto a respective group of pixels of a sensor array 150. That is, each secondary lens, 142 forms an image of the filter 110 onto a respective area of the sensor array 150. Light intensity measurements of cumulative pixels in the sensor array 150 form a set of raw sensor data 160. As used herein, the respective group of pixels onto which the filter image is projected by a secondary lens of the array (e.g., 142) may be referred to as a super-pixel. Light filtered by each segment of the filter array 110, is projected onto a respective subset of pixels of each super pixel. Accordingly, each super pixel measures light intensity of the different wavelengths at a specific position corresponding to the position of the secondary lens. In different embodiments, the sensor may be implement using various ultraviolet, visible, and/or infrared light sensor for technologies including but not limited to charge-coupled device (CCD) sensors and/or complementary metal-oxide semiconductor (CMOS) sensors.

In one or more embodiments, pixel locations for each of the different wavelengths may be indicated by a pixel map. Using the pixel map, pixel data for each wavelength may be extracted from the raw sensor data 160 to produce a set of plenoptic image data. As described in more detail with reference to FIGS. 2-4, for example, light intensity data for the different wavelengths may be analyzed to derive various quantitative measurements of an imaged material.

Figure 2:
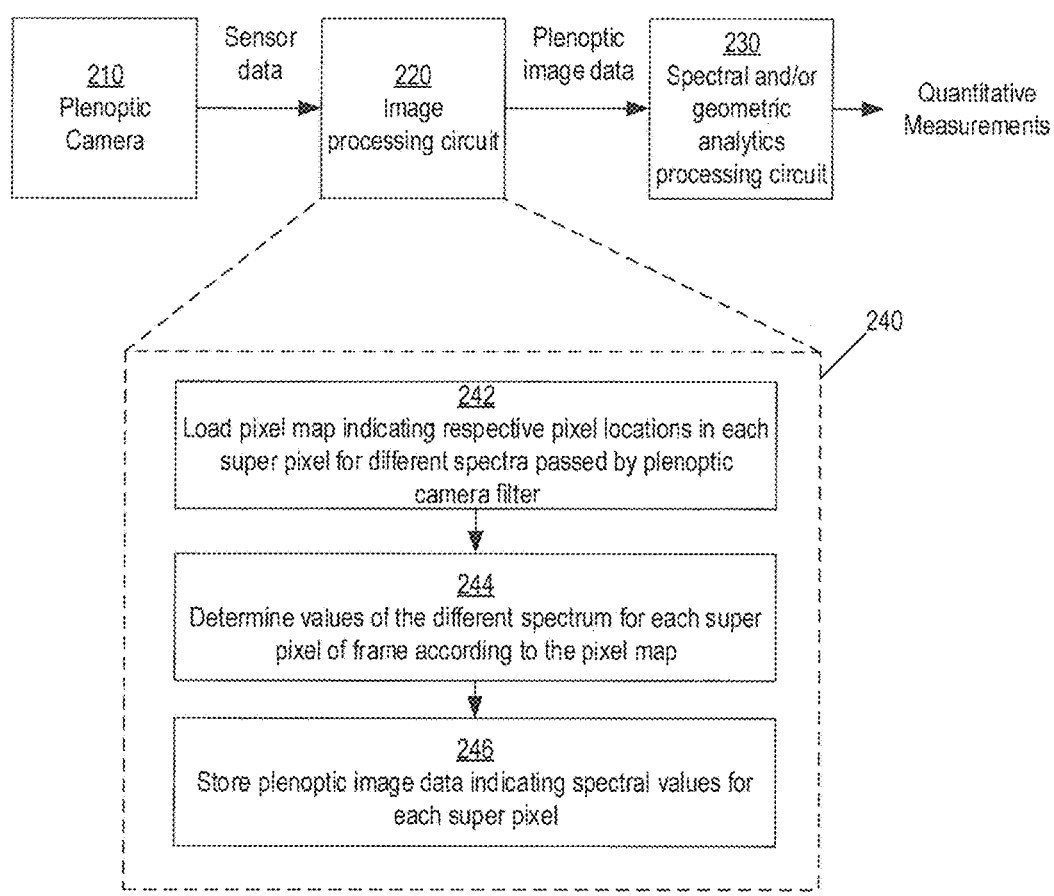
FIG. 2 shows a block diagram of a plenoptic imaging system, in accordance with one or more embodiments of the present disclosure.

FIG. 2 shows a block diagram of a plenoptic imaging system, in accordance with one or more embodiments of the present disclosure. The system 200 includes a first processing circuit 220 configured to process sensor data generated by a plenoptic camera 210 to produce a set of plenoptic image data.

In different embodiments, the first processing circuit 220 may utilize various processes to generate the plenoptic image data. Block 240 shows one example process that may be utilized by the processing circuit 220 to produce the plenoptic image data. At block 242, a pixel map is loaded. The pixel map indicates respective pixel locations for each super pixel for different spectra passed by the plenoptic camera filter. At block 244, light intensity values are determined for different spectra of each super pixel according to the determined pixel locations. At block 246, plenoptic image data, indicating the light, intensity values for the different spectra of each super pixel, is stored. Optionally, in some embodiments, the plenoptic image data may be further processed at block 248 to improve image quality. Such processing may include, for example, correction of non-linearity, background subtraction, artifact removal, or various combinations thereof. Various other image processing techniques known in the art may additionally or alternatively be used to improve image quality.

The system 200 also includes an analytics processing circuit 230 configured to perform spectral and/or geometric based analysis of the plenoptic image data to derive one or more quantitative measurements of an imaged material and/or sample. Quantitative measurements of an imaged material and/or sample may include, for example, distance, size, and/or shape measurements, temperature measurements, atomic and/or chemical composition, concentration, density, atomic state, energy level distribution, and/or direction or velocity of motion. Different embodiments may perform various quantitative and/or qualitative measurements using various processes. Some example processes for determining some various measurements are discussed in more detail with reference to FIGS. 3-4.

Figure 3:
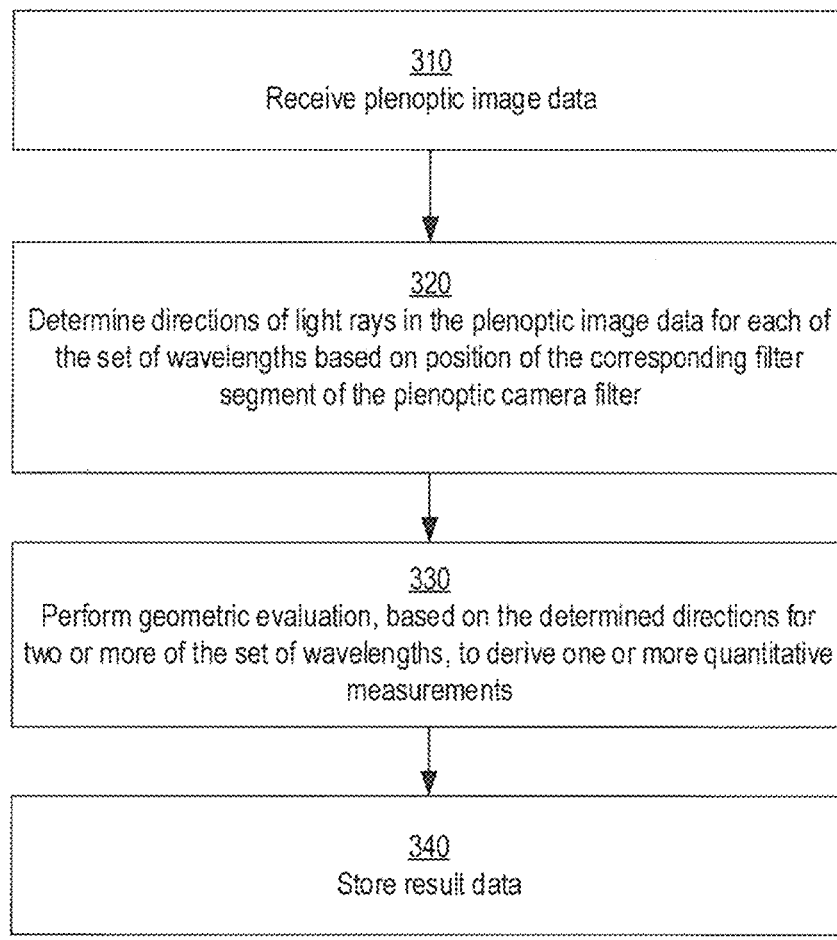
FIG. 3 shows a block diagram of a process for processing plenoptic image data, in accordance with one or more embodiments of the present disclosure.

FIG. 3 shows a block diagram of a first process for processing plenoptic image data, in accordance with one or more embodiments of the present disclosure. At block 310, plenoptic image data is received (e.g., by processing circuit 230 in FIG. 2). At block 320, direction of light rays in the plenoptic image data is determined for each of the set of wavelengths based on position of the corresponding filter segment of the plenoptic camera filter. At block 330, a geometric evaluation of the plenoptic image data is performed, based on the determined light ray directions for two or more of the set of wavelengths, to derive one or more quantitative measurements of imaged materials.

As an illustrative example, parallax calculations may be performed at block 330 using angles of the different light rays to calculate distance to materials depicted at different points in an image. Calculated distances may be used, for example, to reformat the image to as a 3-dimensional (3D) encoded image. Additionally or alternatively, calculated distances from a series of images may be used to plot 3D movement of a materials of interest over time. Moreover, in some embodiments, the geometric analysis performed as block 330 may be used to characterize the size and/or shape of an imaged material. Such characterization may be useful, for example, for tomographic imaging or constructing 3D models (e.g., computer aided design model) of real world objects. As another illustrative example, the geometric analysis performed as block 330 may be used to derive multiple images having different perspectives. As yet another illustrative example, an interferometric process may be performed at block 330 to improve resolution of the plenoptic image data. Results from the geometric evaluation performed at block 330 are stored at block 340.

Figure 4:
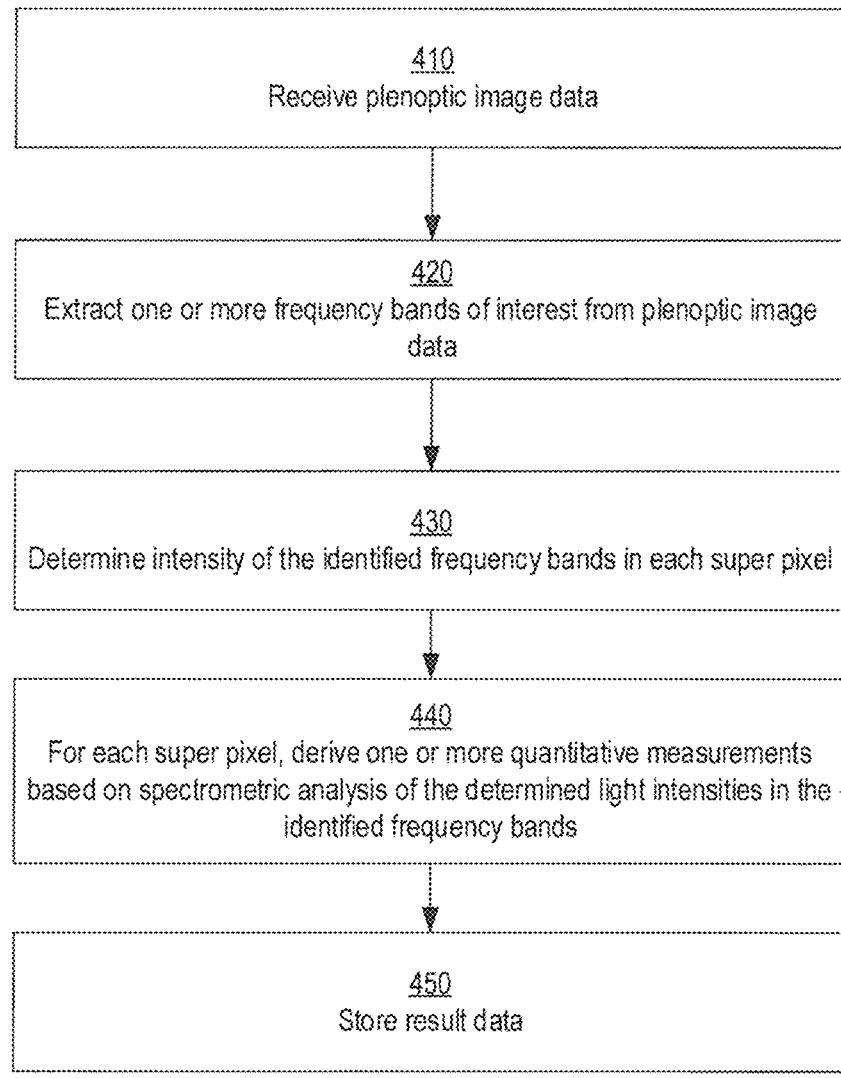
FIG. 4 shows a block diagram of another process for processing plenoptic image data in accordance with one or more embodiments of the present disclosure.

In addition to or in lieu of geometric analysis, some embodiments may perform a spectroscopic analysis in processing of plenoptic image data to derive various quantitative measurements. FIG. 4 shows a block diagram of a process utilizing spectroscopic analysis for processing plenoptic image data, in accordance with one or more embodiments of the present disclosure. At block 410, plenoptic image data is received. At block 420, data for one or more wavelengths of interest is extracted from the plenoptic image data. For each super pixel, intensity of light in the wavelengths of interest is determined at block 430. At block 440, one or more quantitative measurements are derived using spectroscopic analysis of the determined intensities of light.

Spectroscopic analysis may employ various spectroscopic techniques alone or in various combinations. Spectroscopic techniques may include, but are not limited to, for example, measurement of blackbody or greybody emissions, fluorescence, laser induced fluorescence, laser-induced breakdown spectroscopy Raman scattering spectroscopy, Rayleigh scattering, absorption spectroscopy or various combinations thereof. The quantitative measurements derived from the spectroscopic analysis are stored at block 450. In different embodiments, spectroscopic analysis may be used to derive various quantitative measurements including, for example, temperature, density, composition, movement and velocity of materials, or various combinations thereof.

As one illustrative application, one or more embodiments may utilize spectroscopic analysis of the plenoptic image data to perform two-dimensional (2D) pyrometric imaging. Pyrometry uses one or more optical sensors to perform remote temperature measurements of a surface based on light emission and/or absorption by the surface. Measurement performed by many pyrometers is limited to measurement of temperature at a single point. In one or more disclosed embodiments, plenoptic image data is evaluated for each imaged super pixel to provide temperature distributions across the 2D image field. Although some cameras (e.g., near-infrared or mid-infrared cameras) are configured for 2D thermal imaging, such cameras typically determine temperature based on an absolute intensity measurements of a single wavelength. Because these cameras rely on absolute intensity measurements, they can be difficult to calibrate and are susceptible to errors caused by, for example, changes in emissivity, surface finish, composition or phase change, transmission losses, for example through windows, or absorption or emission interferences. Multi-spectral imaging systems may be used for 2D imaging of multiple wavelengths. However, as previously discussed, conventional multi-spectral imaging systems are generally cumbersome and do not scale well as the number of wavelengths to be measured is increased.

In one or more embodiments, a plenoptic camera is configured so each super pixel samples multiple wavelengths across the spectrum at each super pixel—there by allowing 2D imaging of each of the wavelengths. Via spectroscopy analysis of the sampled wavelengths temperature may be determined to produce a 2D thermal image. Various spectroscopic techniques may be utilized, alone or in various combinations, to determine temperature using the wavelength measurements extracted from the plenoptic image data. In one example implementation, blackbody temperature of a material is determined based on a ratio of light emission of an imaged material at a first wavelength to light emission by the imaged material at a second wavelength. As one example implementation, a plenoptic camera may be fitted with a filter configured to isolate a near infrared and green wavelengths (e.g., 800 nm and 550 nm) for respective measurement by respective pixels of each super pixel. A power law curve, indicating temperature as a function of the ratio, may be derived by imaging a material at known temperatures to produce a corresponding set of ratios. The power law curve may thereafter be used to derive temperatures of image materials from the light measurements at the first and second wavelengths.

Although the temperature measurement in the above example determined using measurements of two particular wavelengths, the embodiments are not so limited. For instance, different embodiments may utilize measurements of various other wavelengths to determine temperature. Moreover, in some embodiments, accuracy may be improved using measurements of three or more wavelengths. For example, ratios of several respective pairs of wavelengths may be used to derive multiple temperature measurements. The temperature measurements may be averaged to determine a more accurate temperature measurement. Additionally or alternatively, a curve fitting approach may be used to match the measurements from several wavelengths to theoretical spectra for a given temperature. For example, a plenoptic camera may be configure to measure light intensity at 500, 600, 700, 800, 900, 1000, and 1100 nm. Temperature for theoretical curve may be adjusted until it best fits all of the measured values. In some embodiments, accuracy may be improved by discarding one or more values that deviate from the best fitting curve.

As yet another example application, one or more embodiments may perform a spectroscopic analysis to determine composition of materials. In one or more implementations, a plenoptic camera is fitted with a series of filters configured to identify, atomic and/or chemical compositions of materials of interest (e.g., emissions of cars, industrial factories, supersonic combustors, gas turbine engines, or fundamental combustion studies). Identification of atomic and/or chemical compositions may be based on, for example, emission spectroscopy, absorption spectroscopy, Raman scattering, and/or laser induced fluorescence). For instance, atomic species (such as zinc, potassium, magnesium, aluminum, oxygen, hydrogen, helium, lithium, nitrogen, mercury, iron, copper, sodium etc. or diatomic species such as CH, CN, NH, OH, NO, CO, etc, or polyatomic species (H20, C02, CH2O, CH4, C2H2, C2H4, C3H8, etc.) or others may be detected based on specific wavelengths of light that are emitted and/or absorbed by imaged gases, for example. In some implementations, regions of a filter may be configured to isolate individual spectral, lines for particular atoms and/or molecules of interest. For example, a filter may be configured to isolate 656.3 nm and 486.1 nm wavelengths to facilitate measurement of H-alpha and H-beta, respectively. As an illustrative application, these Hydrogen lines may be used to facilitate various astrometric measurements including, for example, temperature or relative speed of stars and/or sunspot/flare monitoring of the sun.

Additionally or alternatively, Raman scattering or emission spectroscopy or absorption spectroscopy or laser induced fluorescence may be evaluated to assess vibrational and/or rotational characteristics, which may be further indicative of the molecular structure or thermodynamic state of the material or media being studied. In some embodiments, determined atomic/chemical composition data may be used to generate images illustrating 2D distribution of atomic/chemical elements or properties of those elements such as their concentrations or rotational or vibrational temperatures or velocity. Such images may be useful, for example, to detect natural gas leaks in buildings, pipelines, and/or wells. As an illustrative example, a methane gas leak in a pipeline may be detected using a plenoptic camera may be configured to image a first wavelength, at which intensity is affected by absorption by methane, and image a second wavelength, at which absorption by methane does not affect light intensity. By comparing images of the first and second wavelengths, the methane leak may be detected. The ability of the disclosed plenoptic camera to simultaneously image multiple wavelengths across the spectrum allows a single camera to be used for capture data for multiple different quantitative measurements. For example, in one or more embodiments, a plenoptic camera configured to determine atomic/chemical composition, as described above, may be configured to also measure other wavelengths for determining exhaust temperatures and/or burn efficiencies. Additionally or alternatively, in some embodiments, the plenoptic camera may include filters to determine the temperature of a solid material (pipe, smokestack, etc) emitting the gases.

Figure 5:
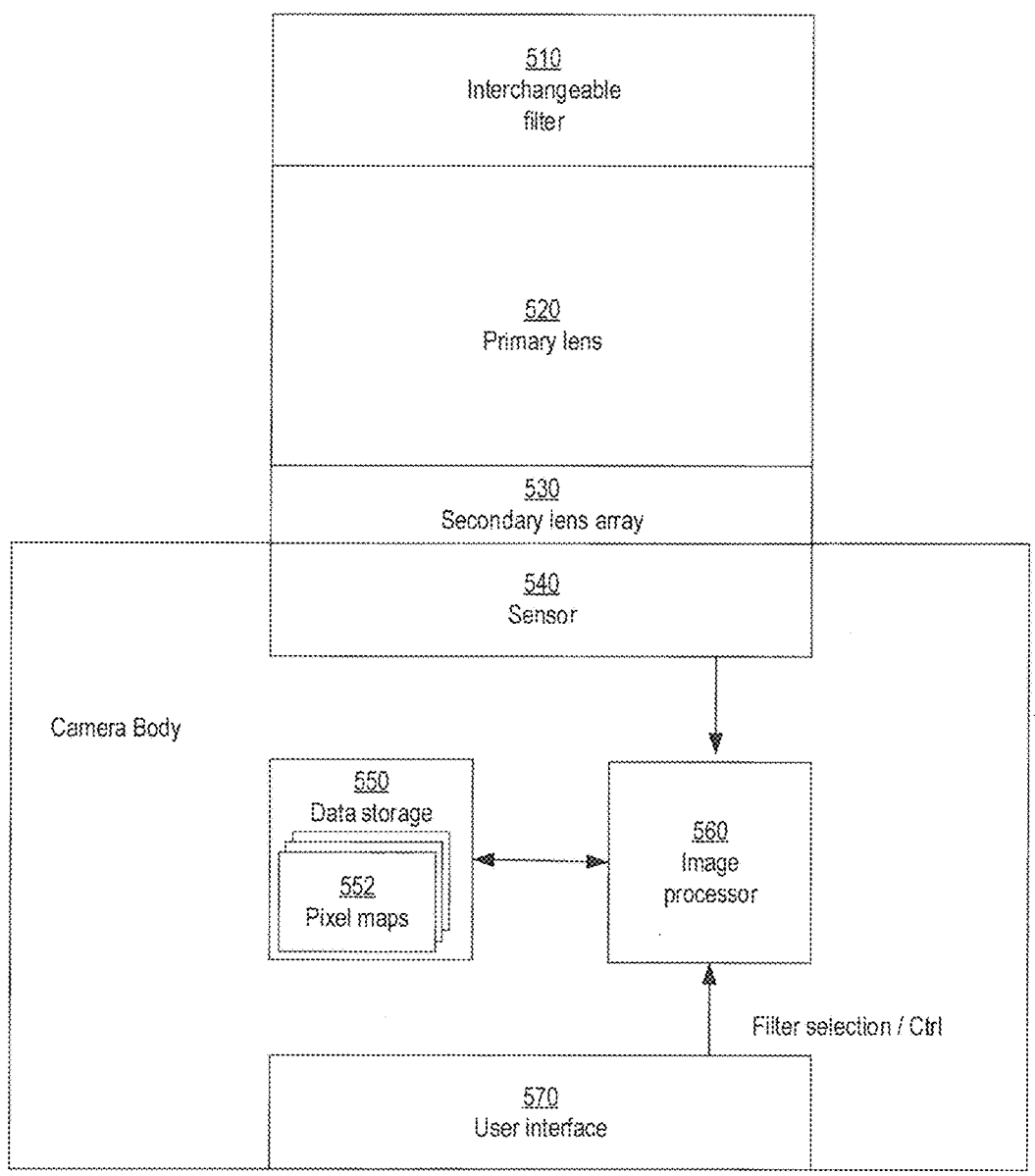
FIG. 5 shows a block diagram of a plenoptic camera that is reconfigurable for use with various different filters, in accordance with one or more embodiments of the present disclosure.

Different applications may require different filters to isolate particular wavelengths of interest. FIG. 5 shows a block diagram of a plenoptic camera that is reconfigurable for use with various different filters, in accordance with one or more embodiments of the present disclosure. The plenoptic camera includes a filter 510, a primary lens 520, a secondary lens array 530, and a sensor 540, which are configured as described with reference to filter 110, a primary lens 130, a secondary lens array 140, and a sensor 150 in FIG. 1. An interface (not shown) between the filter 510 and primary lens 520 is configured to allow the filter 510 to be removed and replaced by a different filter adapted for a different application. The camera further includes a data storage 550, an image processor 560, and a user interface contained in a camera body along with the sensor 540. The data storage includes respective pixel maps for processing plenoptic; data that may be captured using different filters (e.g., 510). The image processor 560 is configured to process data captured by sensor 540 according to one pixel maps 550, corresponding to the current filter 510, to produce a set of plenoptic image data. In some implementations, a user may use the user interface 570 to specify which filter 510 is currently attached. Based on the specified filter, the processor may locate and retrieve the corresponding pixel map 552 to process data from the sensor 540. Alternatively or additionally, the image process may be configured to automatically determine which filter is attached. For instance, the filter may include a non-volatile memory storing a data (e.g., a binary number) that uniquely identifies each type of filter.

Figure 6:
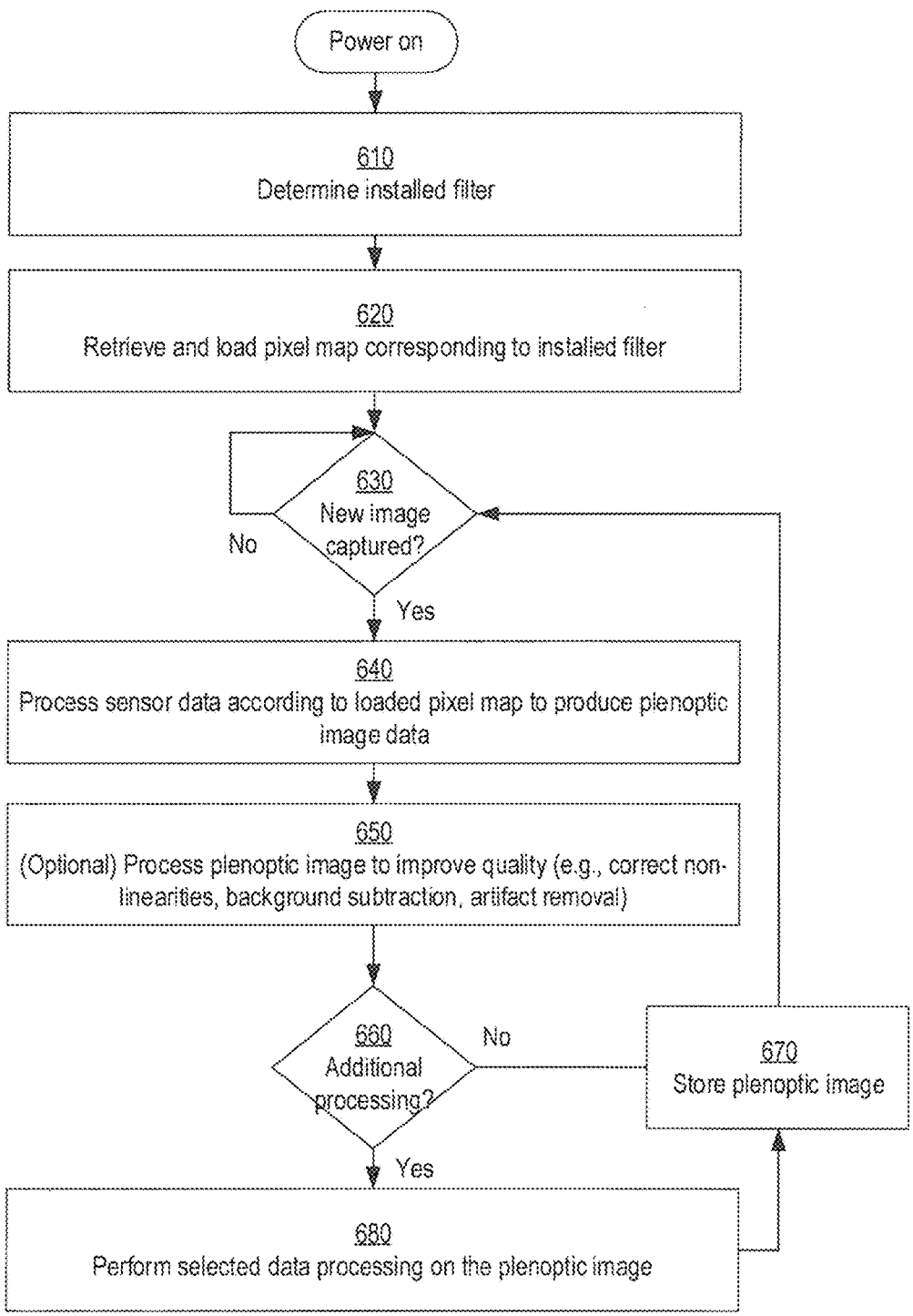
FIG. 6 shows a block diagram of a process for processing a reconfigurable plenoptic camera, in accordance with one or more embodiments of the present disclosure.

FIG. 6 shows a block diagram of an example process for processing a reconfigurable plenoptic camera, in accordance with one or more embodiments of the present disclosure. When powered on, a processing circuit determines the filter that is installed in the plenoptic camera at block 610. At block 620, the processing circuit retrieves and loads a pixel map corresponding to the, filter determined to be installed. Upon a new image being captured, the process proceeds from decision block 630, to block 640. At block 640, sensor data is processed according to the loaded pixel map to produce a plenoptic image data. Optionally, at block 650, the plenoptic image data may be processed to improve image quality as discussed with reference to FIG. 2 (e.g., using non-linearity correction, background subtraction, and/or artifact removal).

In some embodiments, the plenoptic image data may be processed in real time to derive various quantitative and/or qualitative measurements. In some other embodiments, the plenoptic image data may be stored for further processing at a later time. If additional processing is selected at decision branch 660 (e.g., to derive various quantitative measurements) the selected processing is performed at block 680. Otherwise, if no addition processing is selected, or following block 680, the plenoptic image is stored at block 670. The process then returns to decision branch 630 and waits for capture of the next image.

Figure 7:
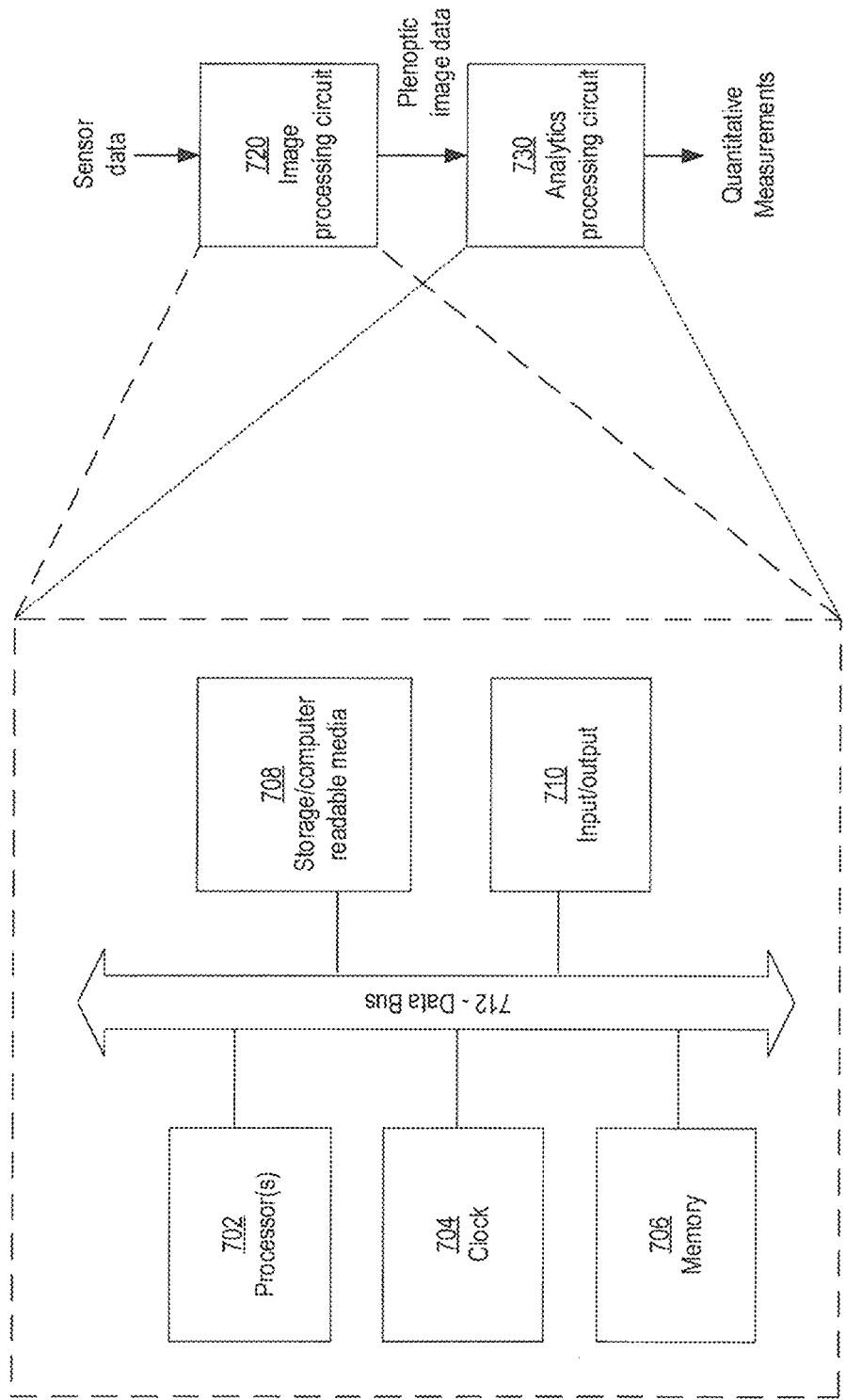
FIG. 7 shows a computing arrangement that may be used to process sensor data and/or plenoptic image data in accordance with one more embodiments of the present disclosure.

FIG. 7 shows a computing arrangement that may be used to process sensor data and/or plenoptic image data in accordance with one more embodiments of the present disclosure. In some implementations, the computing arrangement 700 may be first configured to execute a process 720 for producing a set of plenoptic image data from sensor data, for example, as described with reference to processing circuit 220 in FIG. 2. The computing arrangement 700 additionally or alternatively execute a process 730 that performs spectral and/or geometric based analysis of the plenoptic image data, for example, as described with reference to processing circuit 230. The computing arrangement may be configured to implement one or more of the processes 720 and 730 individually or in various combinations. Where the processor 702 is configured to implement multiple ones of the processes, the respective processes may be performed by separate sub-circuits within the processing circuit (e.g., separate cores), or by one or more shared circuits within the processing circuit (e.g., via scheduling management of multiple threads).

It will be appreciated that various alternative computing arrangements, including one or more processors and a memory arrangement configured with program code, would be suitable for hosting the processes and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory unit 706, a storage unit 708, and an input/output control unit 710 coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 702 may be one or more general purpose processors, or a combination of one or more general purpose processors and suitable co-processors, or one or more specialized processors (e.g., RISC, CISC, pipelined, etc.).

The memory 706 typically includes multiple levels of cache memory, and a main memory. The storage arrangement 708 may include local and/or remote persistent storage, such as provided by magnetic disks (not shown), flash, EPROM, or other non-volatile data storage. The storage unit may be read or read/write capable. Further, the memory 706 and storage 708 may be combined in a single arrangement.

The processor 702 executes the software in storage 708 and/or memory 706 units, reads data from and stores data to the storage 708 and/or memory 706 units, and communicates with external devices through the input/output control unit 710. These functions are synchronized by the clock signal generator 704. The resource of the computing arrangement may be managed by either an operating system (not shown), or a hardware control unit (not shown).

It will be readily understood that the components of various embodiments of the present disclosure, as generally described and, illustrated in the figures herein, may be arranged and designed in a wide variety of different configurations. Thus, the detailed description of the embodiments of the present disclosure, as represented in the attached figures, is not intended to limit the scope of the invention as claimed, but is merely representative of selected embodiments of the invention.

The features, structures, or characteristics of the present disclosure may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages should be or are present in any single embodiment of the present disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment. Furthermore, features, advantages, and characteristics described herein may be combined in any suitable manner in one or more embodiments. For example, although aspects and features may in some cases be described in individual figures, it will be appreciated that features from one figure can be combined with features of another figure even though the combination is not explicitly shown or explicitly described as a combination. Moreover, one skilled in the relevant art will recognize that the invention can be practiced without one or more of the specific features or advantages of a particular embodiment illustrated in the figures or described herein. In other instances, additional features and advantages may be recognized in certain embodiments that may not be present in all embodiments of the present disclosure. One having ordinary skill in the art will readily understand that the embodiments as discussed above may be practiced with steps in a different order, and/or with hardware elements in configurations which are different than those which are disclosed.

Other aspects and embodiments may will be apparent from consideration of the specification. It is intended that the specification and illustrated embodiments be considered as examples only with a true scope of the invention being indicated by the following-claims.

What is claimed is:

1. An apparatus, comprising:
a first processing circuit configured to, in response to receiving image data from a plenoptic camera having a filter configured to transmit light with a plurality of different characteristics in respective regions of the filter, produce a set of plenoptic image data by:
determining respective sets of pixels in the image data corresponding to the different regions of the filter; and
determining intensities of the light with the plurality of different, characteristics for respective super-pixel groups of the pixels in the image data; and
a second processing circuit coupled to the first processing circuit and configured to derive one or more additional quantitative measurements of an imaged material or media from a comparison of the determined light intensities for one, or more of the plurality of different characteristics.

2. The apparatus of claim 1, wherein the second processing circuit is further configured to, in deriving the one or more additional quantitative measurements, performing geometric analysis of an imaged material depicted by the pixels based on angular resolution of the different regions of the filter.

3. The apparatus of claim 1, wherein the second processing circuit is further configured to, in deriving the one or more additional quantitative measurements, perform spectroscopic analysis of the light of one or more of the plurality of different characteristics to determine physical temperatures of portions of materials depicted by the pixels.

4. The apparatus of claim 1, wherein the second processing circuit is further configured to, in denying the one or more additional quantitative measurements, perform spectroscopic analysis of the light of the one or more of the plurality of different characteristics to determine atomic or chemical composition or concentration of an imaged sample depicted by the pixels through natural emission spectroscopy, absorption spectroscopy, Raman spectroscopy or laser-induced fluorescence or other laser based and non-laser based measurement techniques.

5. The apparatus of claim 1, wherein:
the plurality of different characteristics includes a plurality of different spectra; and the set of plenoptic image data produced by the first processing circuit includes a plurality of images for respective frequencies of the plurality of different spectra.

6. The apparatus of claim 1, wherein the first processing circuit is further configured to perform one or more processes to improve image quality of image frames in the set of plenoptic image data.

7. The apparatus of claim 6, wherein the one or more processes includes artifact removal, background subtraction, non-linearization correction, or a combination thereof.

8. The apparatus of claim 1, further comprising the plenoptic camera.

9. The apparatus of claim 8, wherein the plenoptic camera includes:
   a lens arrangement including at least the filter, a primary lens, and an array of secondary lenses;
   a camera sensor positioned to sample respective super pixel images focused by the secondary lenses;
   the first processing circuit,
   the second processing circuit; and
   a camera body coupled to the lens arrangement and enclosing the camera sensor, the first processing circuit, and the second processing circuit.

10. The apparatus of claim 9, wherein the filter includes an etalon filter, a gaseous filter, or a combination thereof.

11. The apparatus of claim 1, wherein further comprising a data storage having a plurality of pixel maps stored therein;
   wherein each pixel map corresponds to a respective one of a plurality of filters and
   maps a respective sets of pixels in the image data to he different regions of the one of the plurality of filters; and
   wherein the first processing circuit is configured to determine the respective sets of pixels in the image data by:
      determining one of the plurality of filters currently attached to the plenoptic camera; and
      retrieving, from the data storage, one of the plurality of pixel maps corresponding to the determined one of the plurality of filters.

12. A method, comprising:
   in response to receiving image data from a plenoptic camera having a filter configured to transmit light of a plurality of different characteristics in respective regions of the filter, produce a set of plenoptic image data by:
      determining respective sets of pixels in the image data corresponding to the different regions of the filter; and
      determining intensities of light of the plurality of different characteristics for respective super-pixel groups of the pixels in the image data; and
   deriving one or more additional quantitative measurements of an imaged material from a comparison of the determined intensities for light of two or more of the plurality of different characteristics.

13. The method of claim 12, wherein the deriving of the one or more additional quantitative measurements includes performing geometric analysis based on angular resolution of the respective regions, of the filter to determine distances to portions of an imaged material depicted by the pixels.

14. The method of claim 12, wherein:
   the plurality of different characteristics includes a plurality of different spectra; and
   the deriving of the one or more additional quantitative measurements includes performing spectroscopic analysis of the two or more of the plurality of different spectra to determine physical temperatures of portions of materials or media depicted by the pixels.

15. The method of claim 12, wherein the plurality of different characteristics includes a plurality of different spectra; and
   the deriving of the one or more additional quantitative measurements includes performing spectroscopic analysis of the two or more of the plurality of different spectra to determine atomic or chemical composition or concentration of an imaged sample or media depicted by the pixels using natural emission spectroscopy, absorption spectroscopy, Raman spectroscopy, laser-induced fluorescence, other laser based and non-laser based measurement techniques, or a combination thereof.

16. The method of claim 15, wherein the spectroscopic analysis includes determining absorption of at least one frequency by an imaged sample.

17. The method of claim 15, wherein the spectroscopic analysis includes determining emissions by an imaged sample of at least one frequency.

18. The method of claim 15, wherein the spectroscopic analysis includes illuminating the imaged sample with a light of the at least one frequency.

19. The method of claim 12, further comprising improving image quality of one or more images in the image data by performing artifact removal, background subtraction, non-linearization correction, or a combination thereof.

20. The method of claim 12, further comprising:
   determining which filter of a set of filters is attached to the plenoptic camera;
   identifying and retrieving one of set of pixel maps corresponding to the determine filter, wherein each pixel map of the set of pixel maps corresponds to a respective one of a plurality of filters; and
   wherein the respective sets of pixels in the image data corresponding to the respective regions of the filter are determined from the retrieved one of the set of pixel maps.

* * * * *